(12) United States Patent
Laing

(10) Patent No.: US 7,660,120 B2
(45) Date of Patent: Feb. 9, 2010

(54) POWER SUPPLY UNIT FOR AN ELECTRICAL APPLIANCE AND METHOD FOR MAKING ELECTRICAL POWER AVAILABLE AT COMPONENTS OF AN ELECTRICAL APPLIANCE

(75) Inventor: Karsten Laing, Althuette (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 385 days.

(21) Appl. No.: 11/710,583

(22) Filed: Feb. 23, 2007

(65) Prior Publication Data

US 2007/0221446 A1    Sep. 27, 2007

Related U.S. Application Data

(63) Continuation of application No. PCT/EP2005/008916, filed on Aug. 17, 2005.

(30) Foreign Application Priority Data

Aug. 26, 2004   (DE) ................. 10 2004 042 034

(51) Int. Cl.
   *H05K 7/20*      (2006.01)
   *G06F 1/20*      (2006.01)
(52) U.S. Cl. ............. 361/698; 361/679.47; 361/679.48; 361/679.53; 361/695; 361/696; 361/699; 361/701; 165/80.3; 165/104.33
(58) Field of Classification Search ................
   361/679.46–679.48, 690, 694–696, 698–699, 361/701–702, 704; 165/80.3–80.4, 104.33; 165/185; 174/16.1, 16.3; 454/184
See application file for complete search history.

(56) References Cited

U.S. PATENT DOCUMENTS

| 4,730,989 | A | * | 3/1988 | Laing | 417/357 |
| 5,001,548 | A | * | 3/1991 | Iversen | 257/714 |
| 5,731,954 | A | * | 3/1998 | Cheon | 361/699 |
| 6,234,240 | B1 | * | 5/2001 | Cheon | 165/80.3 |
| 6,263,957 | B1 | * | 7/2001 | Chen et al. | 165/80.4 |
| 6,313,990 | B1 | | 11/2001 | Cheon | |
| 6,333,849 | B1 | * | 12/2001 | Donahoe et al. | 361/679.47 |
| 6,591,898 | B1 | | 7/2003 | Chu et al. | |
| 6,725,682 | B2 | * | 4/2004 | Scott | 62/259.2 |

(Continued)

FOREIGN PATENT DOCUMENTS

DE   299 12 206   11/1999

(Continued)

OTHER PUBLICATIONS

Patent Abstracts of Japan, vol. 1996, No. 11, Nov. 29, 1996, Abstract of Japanese Patent "Cooling Device of Electronic Equipment," Publication No. 08186388, Jul. 16, 1996.

(Continued)

*Primary Examiner*—Jayprakash N Gandhi
*Assistant Examiner*—Robert J Hoffberg
(74) *Attorney, Agent, or Firm*—Lipsitz & McAllister, LLC

(57) ABSTRACT

In order to make a power supply unit available for an electrical appliance, in particular, for a computer, it is suggested that said electrical appliance has a fan device, wherein a radiator for a liquid cooling device is integrated into the power supply unit.

19 Claims, 5 Drawing Sheets

U.S. PATENT DOCUMENTS

| | | | |
|---|---|---|---|
| 6,747,869 B2* | 6/2004 | Dong | 361/679.52 |
| 7,295,436 B2* | 11/2007 | Cheon | 361/699 |
| 2001/0036061 A1 | 11/2001 | Donahoe et al. | |
| 2001/0045271 A1 | 11/2001 | Li | |
| 2003/0214786 A1 | 11/2003 | Niwatsukino et al. | |
| 2004/0008483 A1 | 1/2004 | Cheon | |
| 2004/0042176 A1 | 3/2004 | Niwatsukino et al. | |
| 2004/0052663 A1 | 3/2004 | Laing et al. | |
| 2004/0070949 A1 | 4/2004 | Oikawa et al. | |
| 2004/0119371 A1 | 6/2004 | Laing | |
| 2004/0246677 A1 | 12/2004 | Chen | |
| 2005/0024824 A1 | 2/2005 | Riebel | |
| 2006/0227504 A1* | 10/2006 | Chen et al. | 361/687 |
| 2007/0223194 A1* | 9/2007 | Laing | 361/699 |

FOREIGN PATENT DOCUMENTS

| | | | |
|---|---|---|---|
| DE | 203 06 214 | | 9/2003 |
| EP | 1 398 511 | | 3/2004 |
| EP | 1 416 607 | | 5/2004 |
| EP | 1 471 409 | | 10/2004 |
| GB | 2433352 | A * | 6/2007 |
| JP | 3431024 | | 5/2003 |
| JP | 3452059 | | 7/2003 |
| JP | 2007004765 | A * | 1/2007 |
| KR | 1020030031027 | | 4/2003 |
| WO | 01/90867 | | 11/2001 |
| WO | 03/098415 | | 11/2003 |

OTHER PUBLICATIONS

*Patent Abstracts of Japan*, vol. 2000, No. 16, May 8, 2001, Abstract of Japanese Patent "Cooling Device," Publication No. 2001015662, Jan. 19, 2001.

* cited by examiner

POWER SUPPLY UNIT FOR AN ELECTRICAL APPLIANCE AND METHOD FOR MAKING ELECTRICAL POWER AVAILABLE AT COMPONENTS OF AN ELECTRICAL APPLIANCE

This application is a continuation of International application No. PCT/EP2005/008916 filed on Aug. 17, 2005.

The present disclosure relates to the subject matter disclosed in International application No. PCT/EP2005/008916 of Aug. 17, 2005 and German application No. 10 2004 042 034.3 of Aug. 26, 2004, which are incorporated herein by reference in their entirety and for all purposes.

BACKGROUND OF THE INVENTION

The invention relates to a power supply unit for an electrical appliance, in particular, for a computer, said electrical compliance comprising a fan device.

The invention relates, in addition, to a method for making electrical power available at components of an electrical appliance, which comprises cooling a circuit arrangement for making the power available via a stream of air from a fan device.

A power supply unit for an electrical appliance serves the purpose of converting electrical power provided externally, such as, for example, mains current, in such a manner that the electrical power can be used by electronic components of the electrical appliance.

Power supply units for computers generally have a fan device in order to be able to cool electronic power components/cooling members via a stream of air.

SUMMARY OF THE INVENTION

In accordance with the present invention, a power supply unit is provided which can be used universally.

In accordance with an embodiment of the invention, a radiator for a liquid cooling device is integrated into the power supply unit.

Components of an electrical appliance which heat up considerably during operation may be liquid cooled in an effective manner. A device for local cooling by means of a liquid is described, for example, in EP 1 398 511 A1 and US 2004/0119371 A1, respectively.

A further liquid cooling device is described in WO 03/098415 A1.

In accordance with the present invention, the radiator of a liquid cooling device is integrated into the power supply unit. In a radiator of a liquid cooling device, an exchange of heat with the surroundings is provided for, in particular, via an increase in the surface area of the flow guidance element or elements in order to be able to cool heated cooling liquid again. Normally, a fan is associated with a radiator in order to be able to act on the radiator with a stream of air. In accordance to the present invention, a fan device is provided, the stream of air from which can cool the components which are necessary for the conversion of electricity with respect to the power supply function and which heat up and can cool cooling liquid in the radiator. The number of structural components may be reduced as a result. Since a fan can be of a larger design, the noise made by the fan may also be minimized.

Since, in accordance to the present invention, only one fan device need be provided, the noise emission of the electrical appliance may be reduced overall.

In accordance with the invention, a combination of power supply unit and liquid cooling device may be made available which can be mounted on or in the electrical appliance in a simple manner and can be connected in a simple manner.

As a result of the fact that the radiator is integrated into the power supply unit, this may also be arranged in a protected manner, in particular, in a housing of the power supply unit. Normally, power supply units have a closed housing and, in particular, steel housing. (The housing has openings in order to enable air to circulate). Radiators are, mechanically, relatively susceptible. As a result of the arrangement in the housing of the power supply unit, these may be protected with respect to mechanical influences. This also applies, in particular, for the mounting of a liquid cooling device on an electrical appliance. As a result, the risk of leakage, for example, on account of damage caused during the mounting is, on the other hand, eliminated.

It is also possible to cool parts of a circuit arrangement of the power supply unit via the radiator. The circuit arrangement serves the purpose of converting electrical power into a form which can be used by internal consumer devices of the electrical appliance. As a result of a corresponding arrangement of the radiator in relation to such a circuit arrangement, this may be liquid cooled in sections, wherein the cooling liquid cooled in the radiator via the fan device is used. Such a liquid cooling of circuit components of the power supply unit may be brought about without any large constructional resources.

It is favorable, in particular, when the radiator is arranged such that it can be acted upon at least partially by a stream of air from the fan device. As a result, an effective cooling not only of the relevant components of the power supply unit (with respect to the conversion of electricity function) but also of the cooling liquid may be brought about.

It is particularly advantageous when a circulation pump for the liquid cooling is provided and, in particular, integrated into the power supply unit. As a result, a module can be made available which contains the necessary components for the liquid cooling; as a result, the liquid cooling device may be mounted on the electrical appliance and also used in a simple manner.

It is favorable when the circulation pump is arranged on a housing of the power supply unit. A power supply-liquid cooling module may then be made available, wherein the circulation pump is already in position. The housing of the power supply unit provides a suitable location for mounting the circulation pump.

The circulation pump is arranged, in particular, outside a housing interior of a housing of the power supply unit. The circulation pump may then be mounted in a simple manner with respect to the power supply unit. When maintenance work has to be carried out on the circulation pump or the circulation pump has to be exchanged, this may be carried out in a simple manner.

It is particularly advantageous when the circulation pump is connected to at least one thermal contact element. The thermal contact element, which is connected to the circulation pump, in particular, via flexible hose-like liquid conduits, can then be fixed to one or more relevant objects of the electrical appliance in thermal contact. For example, it may be positioned on the CPU of a computer and a graphics processor in order to provide for their cooling.

At least one thermal contact element is, in particular, connected to the circulation pump via liquid conduits in such a manner that an object can be contacted thermally by the at least one thermal contact element. Liquid conduits, at which the (at least one) thermal contact element is arranged, are guided out of the power supply unit with integrated circulation pump. The power supply unit is mounted, for example, in the housing of the electrical appliance. The thermal contact element is then positioned on the object, such as a CPU or a graphics processor, and fixed in place. The overall assembly is considerably simplified since the individual components of the liquid cooling device need not be mounted separately in the housing of the electrical appliance.

There are, in principle, two possibilities for arranging the circulation pump and the radiator relative to one another in a flow guidance. With respect to the direction of flow of heated cooling liquid, i.e., in the direction of flow of cooling liquid which flows away from a thermal contact element, the radiator may be arranged upstream of the circulation pump or downstream of the circulation pump. It is favorable when the circulation pump is arranged upstream of the radiator in the flow guidance for cooling liquid with respect to a direction of flow for heated cooling liquid, i.e., the circulation pump follows the thermal contact element. The circulation pump then has heated cooling liquid flowing through it which is subsequently cooled in the radiator. Cooled cooling liquid is then supplied from the radiator directly to a thermal contact element. Such a flow guidance is favorable from an energy point of view.

It is provided, in particular, for the circulation pump to be arranged at or in the vicinity of a feed through for a loom of cables. A loom of cables must be guided via a passage through a housing of a power supply unit. The loom of cables contains the cables, via which internal electrical consumer devices of the electrical appliance are supplied with current. The loom of cables exiting from the power supply unit requires space. For this reason, a specific space must be kept free for the loom of cables behind the power supply unit. When the circulation pump (and, where applicable, also a compensation reservoir) are arranged at or in the vicinity of the passage, this space, which has to be kept free in any case, can then be utilized effectively. The actual spatial requirements of the power supply unit with integrated liquid cooling device are not increased as a result or only slightly. On the other hand, this facilitates the use of the power supply unit according to the invention in standardized housings.

The circulation pump is arranged, in particular, on a supporting plate which is located opposite an electrical connection. Electrical power is coupled into the power supply unit from outside via the electrical connection. Normally, the electrical connection is a mains power connection. When the circulation pump is arranged on an oppositely located supporting plate, the power supply unit need be modified only minimally as such for the integration of a liquid cooling unit; a passage for a loom of cables is normally arranged at the supporting plate. Space must be kept free in any case behind the loom of cables in order to be able to guide this to the outside. When the circulation pump is arranged on the supporting plate, this space in a housing of an electrical appliance can then be utilized for accommodating the circulation pump.

It is particularly advantageous when the radiator and the fan device are arranged one behind the other, wherein the radiator can be arranged in front of or behind the fan device with respect to a suction side. It is ensured by the arrangement of radiator and fan device one behind the other that the radiator can be cooled via the stream of air from the fan device.

It is particularly favorable when the radiator is arranged beneath an electrical connection of the power supply unit. As a result, a circulation of air through an interior space of the power supply unit can be ensured. Normally, openings and, in particular, ventilation slots of a power supply unit are arranged next to the electrical connection. When the radiator is located beneath (under) the electrical connection, such ventilation slots are not covered completely.

It may be provided for an axis of rotation of the fan device to be oriented transversely to an axis of rotation of the circulation pump. As a result, a space-saving integration of the liquid cooling device into the power supply unit may be realized.

It is favorable when the circulation pump has an electric motor with a spherically mounted rotor. Such circulation pumps are described in EP 1 416 607 A2 and US 2004/0119371 A1, respectively, and in EP 1 398 511 A1 and US 2004/0052663 A1, respectively, to which reference is expressly made. Such electric motors and, therefore, the circulation pumps, into which such electric motors are integrated, may be designed with a low height. Furthermore, the corresponding electric motors are particularly silent during running and so the noise emission is reduced. Furthermore, corresponding electric motors have a long service life.

An impeller of the circulation pump is connected, in particular, to the rotor which drives the impeller accordingly.

It is favorable when at least one compensation reservoir for cooling liquid is provided. As a result, it is possible to fill the liquid cooling device with a greater amount of cooling liquid than is necessary for actual operation. As a result, a normal reduction in cooling liquid, for example, due to diffusion and evaporation can be compensated for and so with sufficient prefilling any subsequent filling during the service life of the liquid cooling device is not necessary.

The at least one compensation reservoir is, in particular, integrated into the power supply unit. As a result, an overall system is provided which includes the necessary components for the liquid cooling.

It may be provided for the at least one compensation reservoir to be arranged next to a circulation pump. As a result, the space behind a passage for a loom of cables can, for example, be used.

It may also be provided for the at least one compensation reservoir to be integrated into the circulation pump, i.e., to be arranged, in particular, within a housing of the circulation pump.

It is particularly advantageous when components for a liquid cooling device are integrated into the power supply unit. As a result, a combination of power supply and liquid cooling may be formed which can be mounted in a simple manner, for example, on or in a housing of an electrical appliance. The connection to an object to be cooled or to several objects to be cooled within the housing may also be brought about in a simple manner.

A power supply unit is provided, in particular, into which the components radiator, circulation pump, expansion reservoir and fan device for the radiator of a liquid cooling device are integrated.

It is favorable, in addition, when exiting liquid conduits are present, at which at least one thermal contact element is arranged. The liquid lines are, in particular, of a flexible design as hoses. One or more thermal contact elements can then be positioned in relation to one or more objects to be cooled.

It is particularly advantageous when the liquid cooling device is prefilled with such an amount of cooling liquid that no subsequent filling is necessary during an expected service life. The liquid cooling device contains as a prefabricated system such an amount of cooling liquid (for example, a water-antifreeze mixture) that losses of cooling liquid, for example, due to diffusion and evaporation can be compensated for.

In accordance with the invention, a liquid cooling-power supply module for an electrical appliance is made available, in particular. This comprises the power supply unit in accordance with the invention. Such a module contains the necessary components for a liquid cooling device. It may be mounted in a simple manner on or in the housing of the electrical appliance.

In accordance with the invention, a method is provided via which an effective cooling is achieved.

In accordance with an embodiment of the invention, a stream of air from the fan device is applied on a radiator of a liquid cooling device.

The method in accordance with the invention has the advantages already explained in conjunction with the power supply unit in accordance with the invention.

Additional advantageous embodiments have likewise already been explained in conjunction with the power supply unit according to the invention.

Cooling liquid is guided, in particular, through a power supply unit. It is then cooled in the radiator by means of the fan device, wherein the fan device is a fan device common to the power supply unit and the liquid cooling device.

The following description of a preferred embodiment serves to explain the invention in greater detail in conjunction with the drawings.

DETAILED DESCRIPTION OF THE INVENTION

Figure 1:
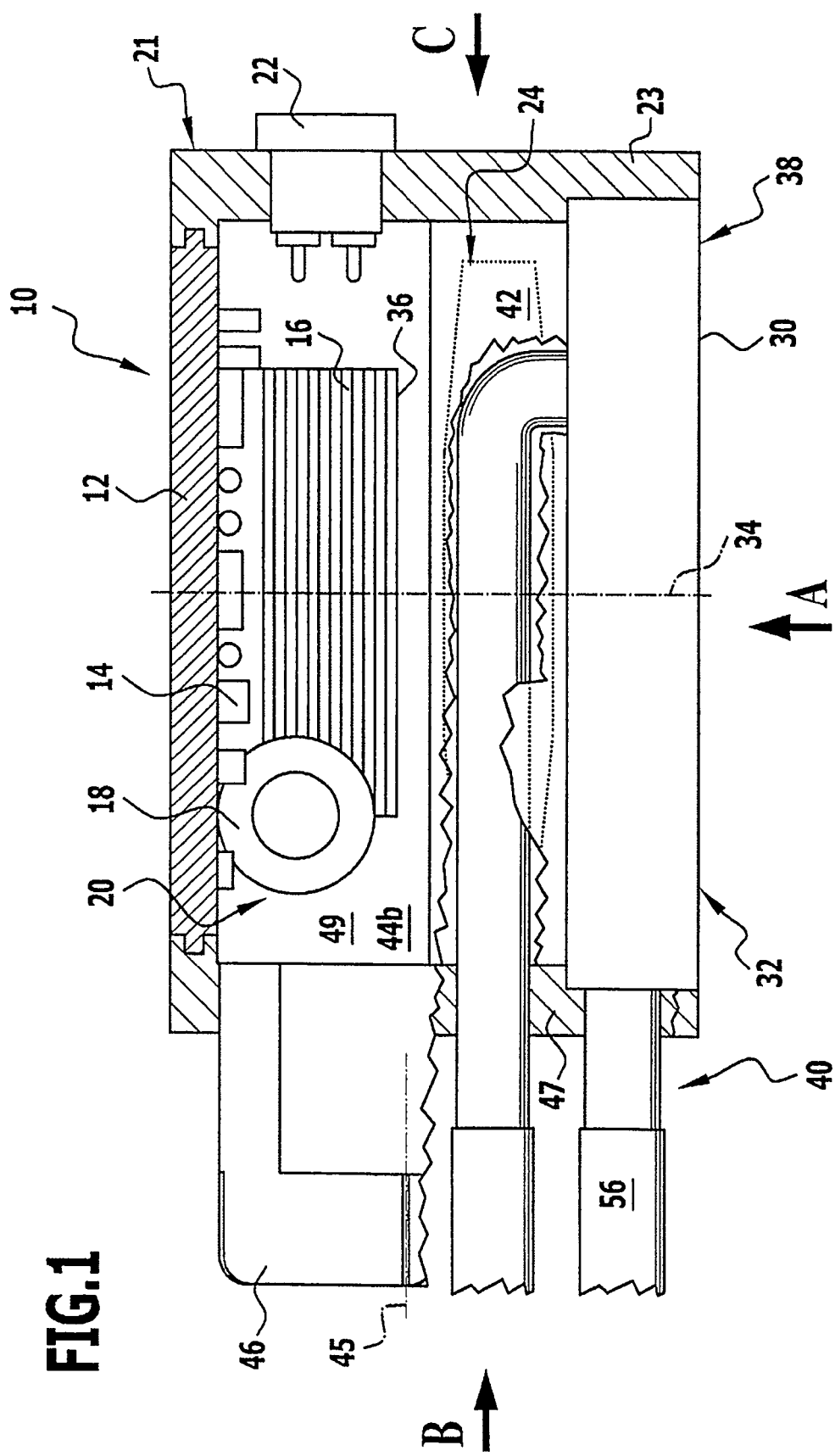
FIG. 1 shows a side sectional view of one embodiment of an electrical power supply unit according to the invention.
Figure 2:
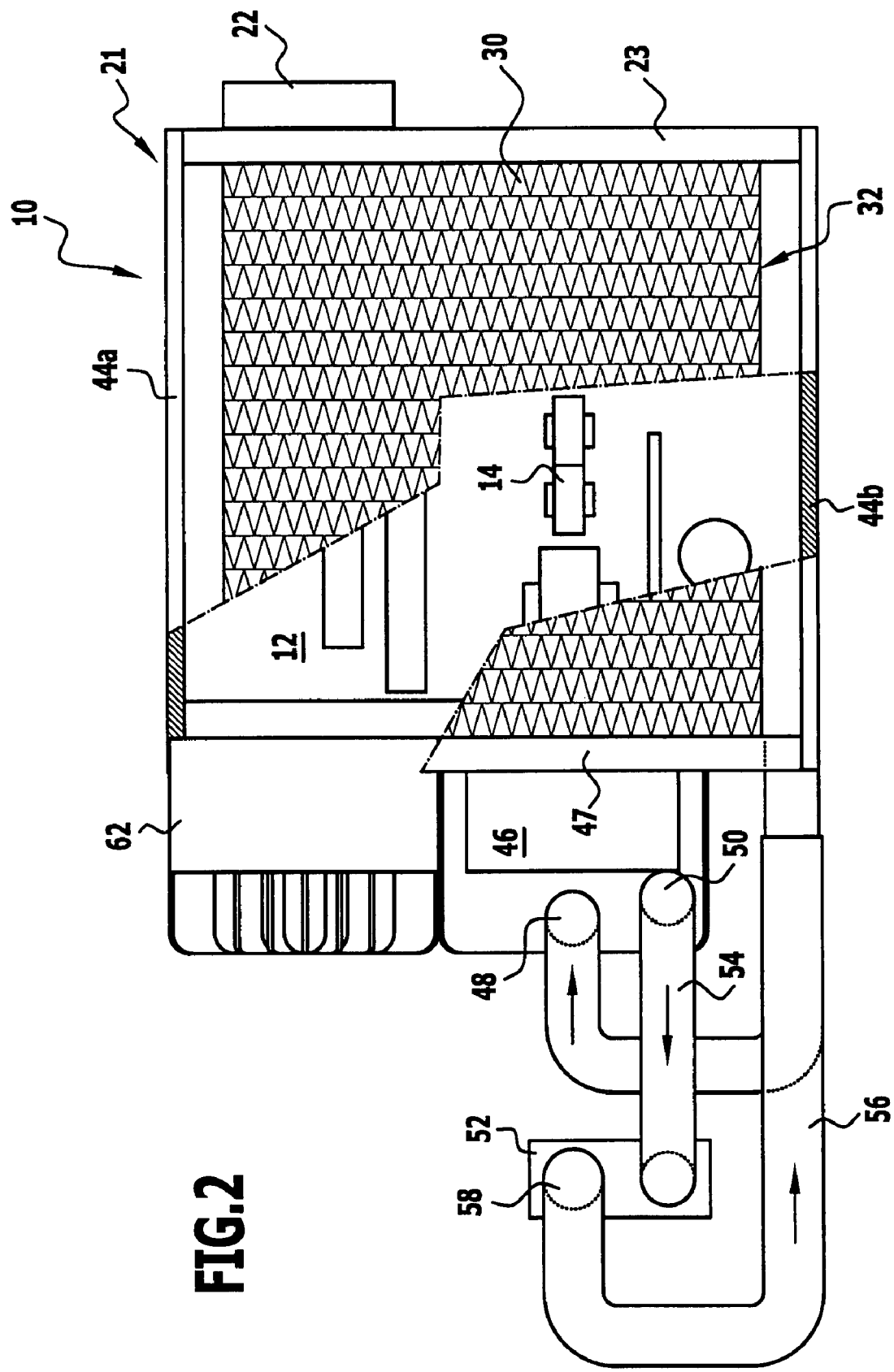
FIG. 2 shows a view of the power supply unit according to FIG. 1 in the direction A without a fan device.
Figure 3:
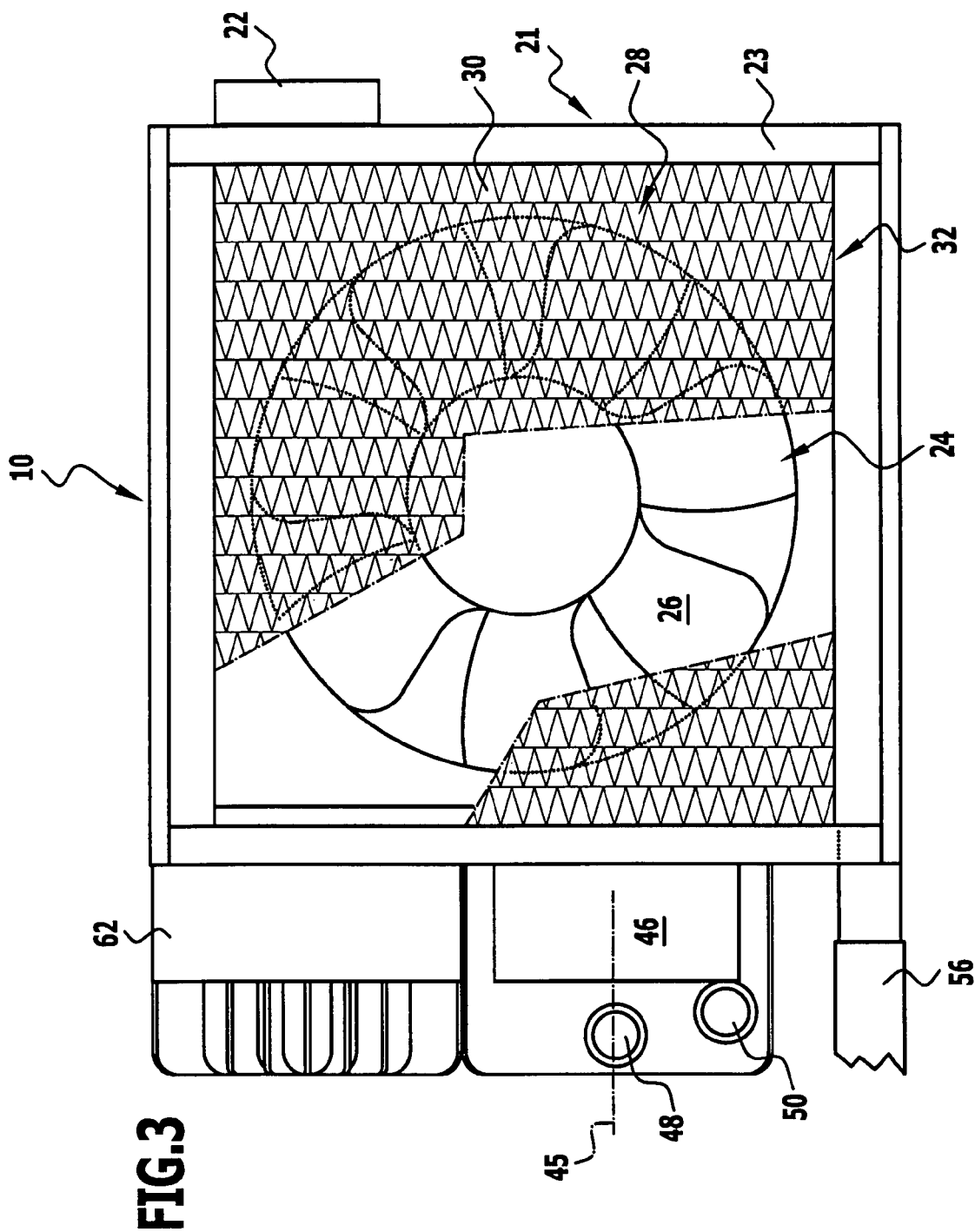
FIG. 3 shows the same view as in FIG. 2 with a fan device (without liquid conduits)

A first embodiment of an electrical power supply unit in accordance with the present invention, which is shown in FIGS. 1 to 5 and designated as 10, comprises a support 12 for functional components 14 of the power supply unit. In particular, electronic components are arranged on the support 12 as functional components 14. A cooling member 16 can also be arranged on the support 12. This cooling member 16 which has a plurality of cooling ribs is in thermal contact with one or several electronic power components 18 of a circuit arrangement 20 which is arranged on the support 12.

The support 12 is arranged in a closed housing 21 which is, in particular, a steel housing.

The electrical power supply unit 10 has an electrical connection 22 for the external supply of current which is, in particular, a mains connection. This is arranged on a rear plate 23 of the housing 21. The rear plate 23 is provided with openings 25 (FIG. 5) which are arranged next to the electrical connection 22. Electrical power may be coupled into the power supply unit 10 via the electrical connection 22, wherein the power supply unit 10 provides for a conversion of electricity with its circuit arrangement 20 and so electrical power can be made available to electronic components of an electrical appliance (electrical device), such as, for example, a computer and, in particular, PC in the required form.

The power supply unit 10 comprises a fan device 24 with a rotatingly driven fan wheel 26 of a fan 28. A protective guard 30 is arranged in front of the fan wheel 26.

The power supply unit 10 has a suction side 32 which is open at least partially (covered by the protective guard 30) so that a cooling stream of air can be generated via the fan 28. The suction side 32 is located transverse and, in particular, at right angles to the rear plate 23. The fan 28 is arranged such that the cooling member 16, in particular, can be cooled via the stream of air. For example, the stream of air is also oriented such that it also acts directly, at least partially, on power components 18.

In the embodiment shown, an axis of rotation 34 of the fan wheel 26 is aligned transversely and, in particular, at right angles to a side surface 36 of the cooling member 16. In addition, the axis of rotation 34 is aligned transversely and, in particular, at right angles to the support 12 for the circuit arrangement 20. Furthermore, the axis of rotation 34 is oriented, in particular, parallel to the rear plate 23.

With the positioning of the power supply unit 10 in a housing of the corresponding electrical appliance, for the power supply of which the unit 10 is responsible, the suction side 32 preferably points downwards into the interior of the housing, i.e., when a power supply unit 10 is mounted, the fan device 24 is located beneath the electrical connection 22 with respect to the direction of gravity. The housing of the electrical appliance is, in particular, provided with an opening, at which the rear plate 23 of the power supply unit 10 is positioned. This opening is normally located at a rear side of the housing of the electrical appliance.

In accordance with the invention, it is provided for a radiator 38 of a liquid cooling device 40 to be integrated into the power supply unit 10.

The radiator 38 is arranged, in particular, such that it can be acted upon at least partially by the stream of air from the fan device 24 in order to provide for cooling.

A circulation of air with the surroundings is facilitated by the openings 25 designed, in particular, as ventilation slits. As a result, air can pass freely through the housing of the electrical appliance.

The radiator 38 has a cooling section 42, through which (heated) liquid flows. In the cooling section 42, the liquid can be cooled by the fan device 24, in particular, on account of the action of the stream of air.

In the solution according to the invention, a common fan device, namely the fan device 24 for the power supply unit 10 and for the liquid cooling device 40, is provided. The fan wheel 26 can be of a larger design; as a result, the generation of noise by the fan device 24 is reduced.

In order to hold the radiator 38 and in order to close the housing 21), the housing 21 of the power supply unit 10 comprises, for example, oppositely located holding plates 44a, 44b. The holding plates 44a, 44b can also hold the fan device 24 and the support 12 for the circuit arrangement 20.

In the power supply unit 10, the radiator 38 and the fan device 24 are arranged one behind the other so that the stream of air from the fan device 24 flows past the cooling section 42. In relation to the protective guard 30, the fan device 24 can be arranged in front of or behind the radiator 38. The radiator 38 is arranged in the housing 21 so as to be mechanically protected.

It may be provided, for example, for the radiator 38 to "cover" only one section of the flow surface of the fan device 24 so that the stream of air from the fan 28 can act directly on the cooling member 16 via another section.

It is provided in accordance with the invention for a circulation pump 46 of the liquid cooling device 40 to be integrated into the power supply unit 10. The circulation pump 46 is, for example, a circulation pump with a spherically mounted rotor, on which an impeller is seated in a non-rotatable manner in relation to the rotor. Such a circulation pump is described, for example, in EP 1 398 511 A1 and US 2004/0052663 A1, respectively, or in EP 1 416 607 A2 and US 2004/0119371 A1, respectively. Reference is expressly made to these publications.

An axis of rotation 45 of the rotor of the circulation pump is located transverse and, in particular, at right angles to the axis of rotation 34 of the fan wheel 26.

The power supply unit 10 forms a liquid cooling-power supply unit module which can be inserted into a housing of the corresponding electrical appliance (for example, a computer).

The circulation pump 46 is fixed, in particular, to a holding plate 47 which is located opposite the rear plate 23 and is seated between the holding plates 44a, 44b. It is arranged, in particular, outside a housing interior 49 of the housing 21.

Figure 4:
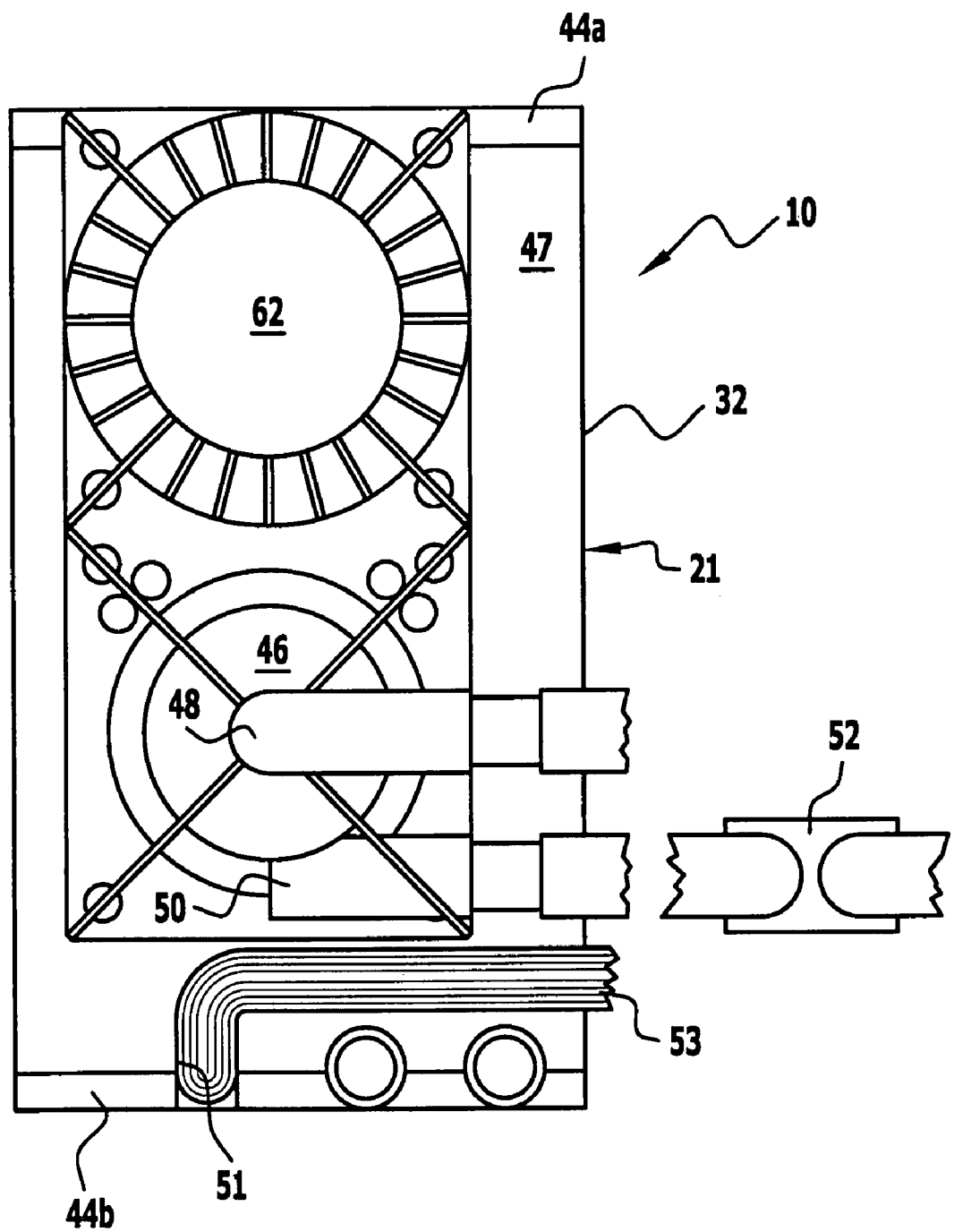
FIG. 4 shows an external plan view of the power supply unit according to FIG. 1 in the direction B and FIG. 5 shows an external plan view of the power supply unit according to FIG. 1 in the direction C (opposite direction to direction B).
Figure 5:
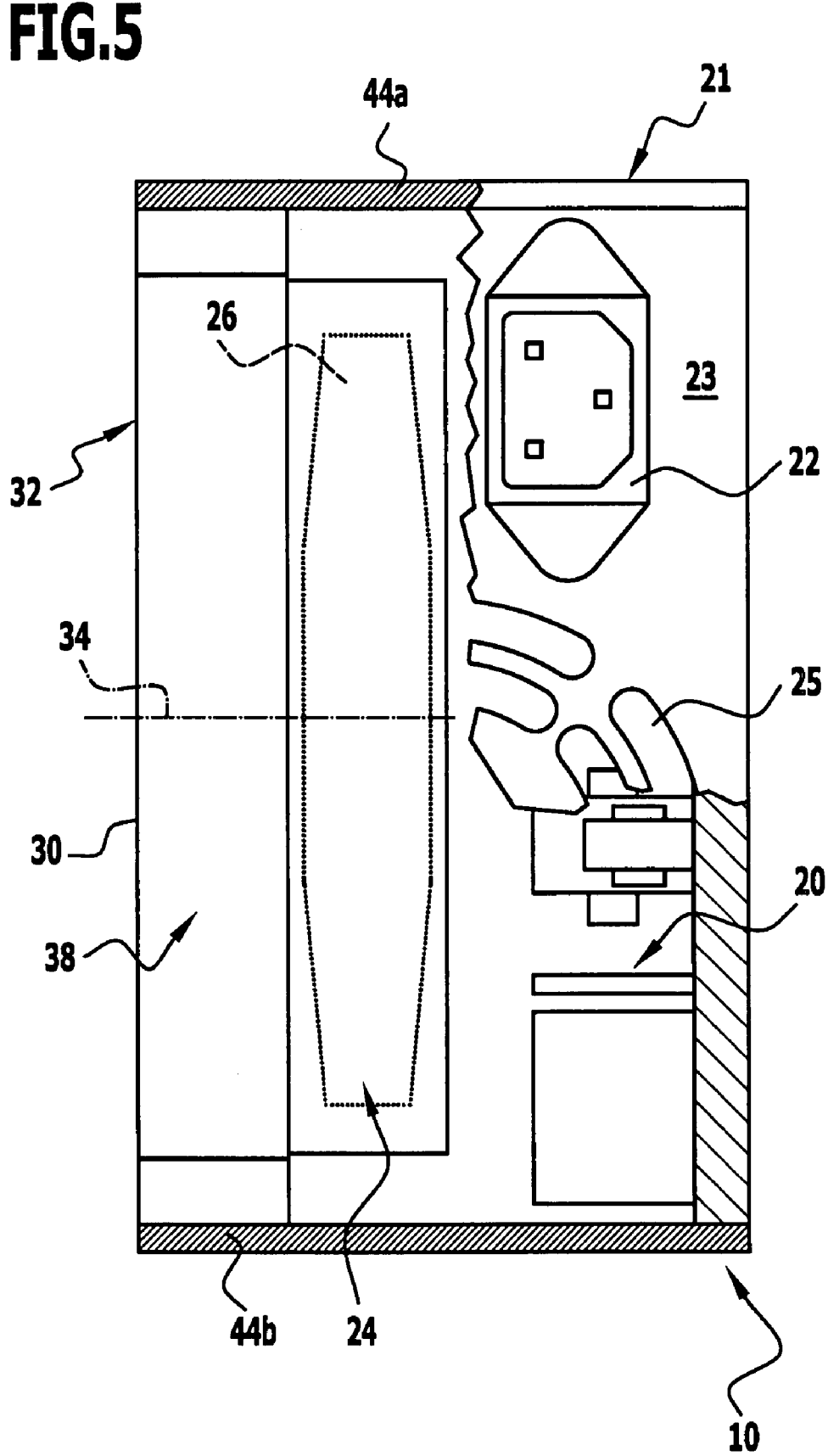

A feed through 51 for one or several looms of cables 53 is seated on the holding plate 47 (FIG. 4). Current is supplied to electrical consumer devices of the electrical appliance via this loom of cables 53 (or looms of cables 53, respectively).

The circulation pump 46 is supplied with electrical power via the electrical power supply unit 10. For this purpose, it is connected electrically to corresponding outlet connections of the circuit arrangement 20, for example, by means of cables of the loom of cables 53.

The circulation pump 46 has a first liquid connection 48 and a second liquid connection 50. (At least) one thermal contact element 52 is in effective fluid connection with these two connections 48, 50 and this contact element can be fixed to one or several electronic power components of the electrical appliance in order to be able to carry heat away.

For example, it is provided for the thermal contact element 52 to be fixed to the CPU of a computer in thermal contact with it. Alternatively or in addition, it may also be provided for the thermal contact element 52 or an additional thermal contact element to be connected to a graphics processor of a computer.

The thermal contact element 52 serves the purpose of providing the thermal contact to a heat source (heat sink). The thermal contact element 52 has cooling liquid flowing through it to enable it to carry heat away from the thermal contact element 52 and, therefore, from the heat source.

The thermal contact element 52 is connected to the second liquid connection 50 of the circulation pump 46 via a first liquid conduit 54. This is, in particular, a (flexible) hose.

The thermal contact element 52 is connected to the first liquid connection 48 of the circulation pump 46, in addition, via a second liquid conduit 56.

The radiator 38 is arranged between a corresponding connection 58 of the thermal contact element 52 and the first liquid connection 48 of the circulation pump 46; heated cooling liquid which comes from the thermal contact element 52 may be cooled in the radiator 38 with its area cooling section 42 so that cooled cooling liquid can be supplied to the circulation pump 46 via the liquid connection 48.

It is also possible for the connection 58 of the thermal contact element 52 to be connected to the circulation pump 46 via the connection 48. The connection 50 is then connected to the radiator 38. In the flow guidance of the cooling liquid, the circulation pump 46 is then arranged immediately downstream of the thermal contact element 52 and upstream of the radiator 38. As a result, the circulation pump 46 has heated cooling liquid flowing through it prior to its cooling in the radiator 38.

The circulation pump can also supply several thermal contact elements with cooling liquid or several circulation pumps are provided.

The liquid cooling device 40 comprises a compensation reservoir 62 for cooling liquid. This may be a separate vessel, as shown in the Figures, or the compensation reservoir can be integrated into the circulation pump 46.

The compensation reservoir 62 has, for example, a volume in the order of magnitude of 50 cm$^3$. It is arranged, in particular, on the holding plate 47 next to the circulation pump 46.

The liquid cooling device 40 is preferably prefilled with the required amount of cooling liquid which is sufficient for the expected customary service life and so no subsequent filling is necessary. The compensation reservoir 62 makes the additional space required for this available for the cooling liquid.

In accordance with the invention, a prefabricated liquid cooling device 40 is made available which is integrated into the power supply unit 10; as a result, a prefabricated liquid cooling-power supply module is formed which can be inserted as a whole into a housing of an electrical appliance. The thermal contact element or elements 52 are then brought into thermal contact with the objects of the electrical appliance to be cooled, in particular, with electronic power components, i.e., are fixed mechanically in position relative to them in such a manner that a good thermal contact is present.

During operation of the power supply unit 10, this makes the necessary electrical power available to the electrical appliance. Furthermore, the circulation pump 46 is driven in order to pump cooling liquid through the thermal contact element or elements 52. As a result, heat may be transferred from the corresponding object in contact with a thermal contact element 52.

The heated cooling liquid is then fed to the radiator 38, at which it can cool. A stream of air from the fan device 24 acts on the radiator 38 and preferably the circuit arrangement 20 of the power supply unit 10, as well, at least partially. In this respect, the fan device 24 provides at the same time for an air cooling of the heated cooling liquid and for an air cooling of the circuit arrangement 20.

In this respect, it is possible for the radiator 38 to be arranged such that cooled cooling liquid is guided past the circuit arrangement 20 in order to be able to cool this in addition—via cooling liquid.

The fan device 24 is a fan device common to the radiator 38 and the power supply unit 10 and, in particular, its circuit arrangement 20.

An additional fan device can be omitted as a result of the combination of the liquid cooling device 40 and the power supply unit 10 with integrated radiator 38. A compact module is made available which may be mounted in a housing of an electrical appliance in a simple manner. The fan 28 for the radiator 38 may be enlarged and, therefore, the noise made by the fan may be reduced.

The radiator 38 is arranged in the housing 21 in a protected manner.

The cooling liquid-power supply module is preferably prefabricated, i.e., all the necessary components of the liquid cooling device 40 are assembled; in particular, the radiator 38, the circulation pump 46, the fan device 24, the liquid conduits 54, 56 and also the thermal contact element or elements 52 are assembled. Furthermore, the system is prefilled with an adequate amount of cooling liquid and so no subsequent filling during the customary expected service life of the module is necessary.

The invention claimed is:

1. A power supply unit for an electrical appliance for making available electrical power to the electrical appliance, said electrical appliance having a fan device, said power supply unit comprising:

a substantially closed housing;

an electrical connection for supplying current;

a radiator for a liquid cooling device, said radiator being integrated into the power supply unit and arranged in the housing; and a circulation pump for the liquid cooling device, said circulation pump being arranged on the housing of the power supply unit; and wherein the circulation pump is supplied with electrical power via the power supply unit.

2. The power supply unit as defined in claim 1, wherein the radiator is arranged such that it is acted upon at least partially by a stream of air from the fan device.

3. The power supply unit as defined in claim 1, wherein the circulation pump is arranged outside an interior of the housing of the power supply unit.

4. The power supply unit as defined in claim 1, wherein the circulation pump is connected to at least one thermal contact element.

5. The power supply unit as defined in claim 1, wherein at least one thermal contact element is connected to the circulation pump via liquid conduits in such a manner that an object is adapted to be thermally contacted by the at least one thermal contact element.

6. The power supply unit as defined in claim 1, wherein in a flow guidance for cooling liquid, the circulation pump is arranged upstream of the radiator with respect to a direction of flow for heated cooling liquid.

7. The power supply unit as defined in claim 1, wherein the circulation pump is arranged at or in a vicinity of a feed through for a loom of cables.

8. The power supply unit as defined in claim 1, wherein the circulation pump is arranged on a supporting plate located opposite an electrical connection.

9. The power supply unit as defined in claim 1, wherein an axis of rotation of the fan device is oriented transversely to an axis of rotation of the circulation pump.

10. The power supply unit as defined in claim 1, wherein the radiator and the fan device are arranged one behind the other.

11. The power supply unit as defined in claim 1, wherein the radiator is arranged beneath an electrical connection of the power supply unit.

12. The power supply unit as defined in claim 1, wherein at least one compensation reservoir for cooling liquid is provided.

13. The power supply unit as defined in claim 12, wherein the at least one compensation reservoir is integrated into the power supply unit.

14. The power supply unit as defined in claim 12, wherein the at least one compensation reservoir is arranged next to a circulation pump.

15. The power supply unit as defined in claim 12, wherein the at least one compensation reservoir is integrated into the circulation pump.

16. The power supply unit as defined in claim 1, wherein components for the liquid cooling device are integrated into the power supply unit.

17. The power supply unit as defined in claim 16, wherein the radiator, the circulation pump, a compensation reservoir and the fan device for the radiator are integrated into the power supply unit.

18. The power supply unit as defined in claim 16, comprising liquid conduits, at least one thermal contact element being arranged at said conduits.

19. The power supply unit as defined in claim 1, wherein the liquid cooling device is prefilled with such an amount of cooling liquid that no subsequent filling is necessary during an expected service life.

* * * * *